G. C. HARTER.
MUSTARD BEATER.
APPLICATION FILED OCT. 7, 1916.
1,237,778.
Patented Aug. 21, 1917.
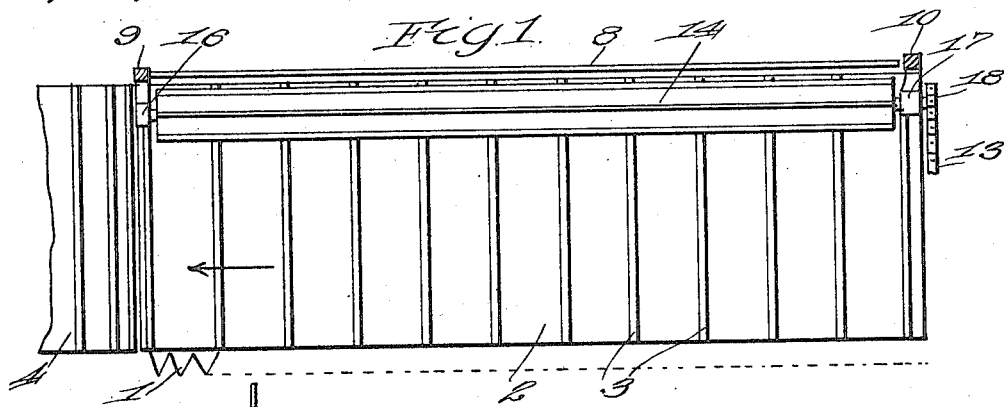
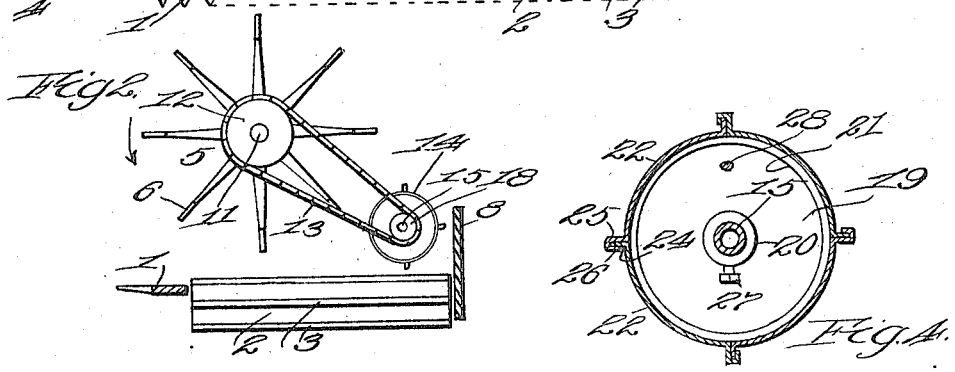
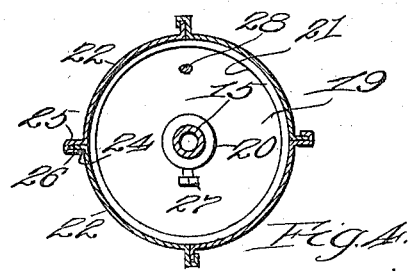
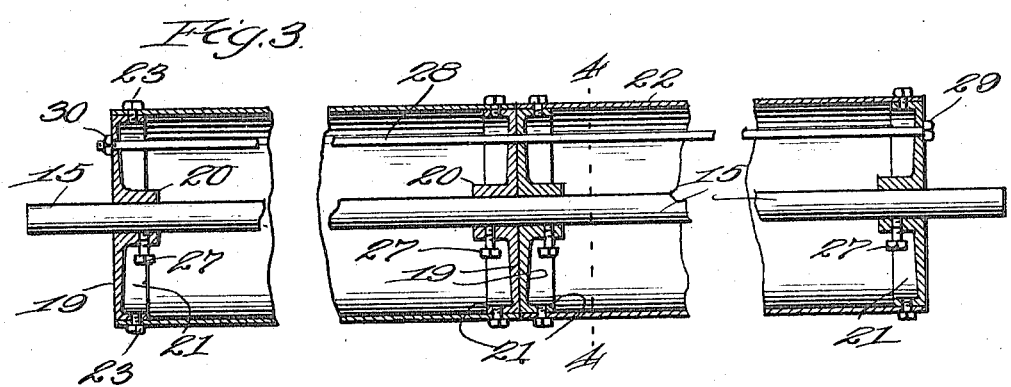
INVENTOR.
George C. Harter
BY
Carl M. Crawford
ATTORNEYS.

UNITED STATES PATENT OFFICE.

GEORGE C. HARTER, OF LIND, WASHINGTON.

MUSTARD-BEATER.

1,237,778.

Specification of Letters Patent.

Patented Aug. 21, 1917.

Application filed October 7, 1916. Serial No. 124,418.

*To all whom it may concern:*

Be it known that I, GEORGE C. HARTER, a citizen of the United States, residing at Lind, in the county of Adams and State of Washington, have invented new and useful Improvements in Mustard-Beaters, of which the following is a specification.

This invention relates to improvements in devices for holding cut stalks down upon the draper of a platform cutting mechanism, such as used on a header or combine harvester, devices of this character usually being termed mustard packers or beaters, by reason of the fact that more difficulty is experienced in connection with mustard weeds than any other noxious growth.

In the great Northwestern country this mustard growth exceeds the wheat in height and its fine branches spread outwardly in a thick but delicate tangle-like mass thereby making the top portions very fluffy and resilient. When these mustard weeds grow very thick in the wheat, a great deal of trouble is experienced by reason of the fact that the mustard fluffs up on the platform draper to such an extent that it even clogs the reel by becoming tangled with the slats. It also forms such a bulky and resilient mass behind the reel, and in front of the screen of the platform, that heretofore it has been necessary to employ a man to follow the platform with some kind of an implement such as pitch fork, and continuously pack down the mustard to prevent the same from discharging over and behind the screen and carrying a great deal of wheat with it. The mustard weed is so mixed into and intertwined with the wheat that it tends to lift the wheat off from the platform draper and therefore greatly interferes with conveyance by the platform draper up to the elevating draper. The operation of packing down the mustard functions to give traction to the sticks on the draper to permit the latter to convey the mustard, along with the wheat, up to the elevating draper that leads to the combine hopper.

Before perfecting my invention, I made various attempts not only to avoid the employment of a separate employee for this packing operation, but also to hold down the mustard on the draper so that the draper could carry it to the elevator. I first employed a fixed guard overhanging the draper and then I employed a rotary paddle-like structure extending along and above the draper and behind the reel. The fixed guard was found to be defective because of the fact that the traveling draper beneath the guard would clog the mustard by reason of the stationary superposed pressure of the guard. The paddle arrangement was also defective because of its intermittent pressure on the mustard and by reason of the fact that the mustard would tangle in the paddle structure.

I finally developed a structure which would impart a constant and sustained pressure of the mustard down upon the sticks of the advancing platform draper, the constant pressure being under continual operation, and I found that this device was so successful that it entirely dispensed with employment of a separate man for packing, and it also successfully operated on the mustard so that the platform draper would advance it to the elevator without clogging either in my device or without being carried forward by the reel.

In the following specification I will point out the one particular means which I prefer to employ and in the subjoined claims I will particularly set forth the nature of my invention.

In the drawing:—

Figure 1 is a plan view of a platform cutting mechanism which may be either a header or a combine, or the like, a portion of an elevator draper being shown at the left, and the reel being omitted.

Fig. 2 is an end view looking from the right of Fig. 1 showing the reel and the device of my invention.

Fig. 3 is an enlarged longitudinal sectional view of my improved mustard beater.

Fig. 4 is a transverse sectional view on line 4—4 of Fig. 3.

Like characters of reference designate similar parts throughout the different figures of the drawings.

While in the majority of instances, these various devices have been termed mustard punchers and mustard beaters, I do not wish to be understood as limiting my invention to operation upon this particular character of weeds since it is effective on other weeds which objectionably clog conveyance by the platform draper, and therefore I will refer to my device as a mustard beater without in any way desiring to limit its operation upon this particular character of weeds.

As illustrated, I have shown the device of my invention in connection with a platform cutting mechanism in which 1 designates sickle, 2 the platform draper having the usual draper slats 3, the platform draper delivering to an elevator draper 4. A reel is designated at 5 and is provided with the usual slats 6. Rearwardly of the draper 2 is the usual screen 8 and I have very generally indicated frame portions 9 and 10 as suitable mountings for the device of my invention. The reel shaft is designated at 11 and I dispose a sprocket 12 on the same over which a sprocket chain 13 is trained.

Referring now more particularly to the device of my invention, 14 designates as a whole, my improved mustard beating drum which is mounted upon a shaft 15. I have found that gas pipe serves very well as shafting and I have shown the shaft mounted in bearings 16 and 17, connected in any suitable manner with the frame work such as 9 and 10. Any form of adjustment for regulating the height of the drum may be provided as desired. On the shaft 15 is disposed a sprocket 18 over which chain 13 is trained to communicate rotary motion from the wheel to the mustard beater. In practice, I have found that a two to one transmission is very effective.

It will be seen by reference to Figs. 1 and 2 that the beater is disposed in spaced relation above and extends along the draper 2 between the reel and the screen and substantially throughout the length of the reel and draper. Likewise, it will be clear that the beater rotates about an axis parallel with the axis of rotation of the reel and that the axis of rotation of the beater is substantially at right angles to the path of travel of the draper, the latter traveling in the direction of the arrow indicated in Fig. 1. I have obtained the best results by rotating the beater in the same direction as the reel rotates, in accordance with the drive shown in Fig. 2.

In addition to the broad idea of disposing a beater as shown in Fig. 2, my invention also includes specific features of novelty which I will now point out more particularly by reference to Figs. 4 and 5.

As headers and like machines are made of different widths I preferably make my improved beater in sections so that it will not be necessary to make a special beater for each size machine. As illustrated in Fig. 3, two sections are mounted on shaft 15 and a description of the construction of one section, will be sufficient. End heads 19 are provided having flat abutting faces, as clearly shown, said heads being provided with hubs 20 for telescopic engagement over shaft 15. The heads 20 are provided with inwardly turned annular flanges 21. In order to form a drum out of each section, I provide segmental strips 22 which in practice are four feet in length. The width of said strips are equal to a quarter of the circumference of the drum and the end margins of said strips are fitted upon the flanges 21, as shown in Fig. 4, and are securely bolted thereto by means such as bolts 23. The lateral margins of the segments 22 are turned up to form projecting beaters extending from the periphery of the drum section, as clearly shown in Fig. 4. I preferably form one margin 24, of each segment, somewhat shorter than the remaining margin 25 of the abutting section, and the margin 25 is turned over the margin 24, as indicated at 26, to not only form a tight joint but also to stiffen the beater and render the same strong enough to effectively beat and punch down the mustard on rotation of the device. In the form shown, I have provided four beaters for each drum section.

In order to avoid the expense of keying the sections on to the shaft, I have shown the hubs 20 provided with set screws 27 whereby each end head may be secured to the shaft 15. In addition to the set screws 27, I provide means for not only coupling a plurality of sections together but also preventing independent rotation of one section with respect to the other.

As shown, said means may comprise a rod 28 extending through all the heads of the sections and having a head 29, on one end thereof and a nut 30 on the other end. Thus if any one of the set screws 27 should get loose, the rod 28 would hold the loosened head in place. Furthermore this rod 28 will hold the sections in tight end to end abutting relation.

I desire to emphasize and urge the importance of constantly pressing the mustard down unto the draper 2, as is possible by the continuous drum structure 14, in contradistinction to separated paddles. By means of this constant downward pressure, the draper 2 continually feeds the mustard toward the elevator and there is no chance for the mustard to bunch and clog the parts.

It is believed that the novelty and utility of my invention will be clearly understood from the foregoing description, and while I have herein shown and described one specific form of my invention, I do not wish to be limited thereto except for such limitations as the claims may import.

I claim:—

1. In combination, a platform grain cutting mechanism including a draper and reel, and movable means extending along and above said draper and substantially co-extensive in length with the reel and located at one side of said reel for constantly pressing the cut material down onto said draper to prevent clogging and initiate conveyance of the mustard by the draper, substantially as described.

2. In combination, a platform grain cutting mechanism including a draper and a reel, and rotatable means the axis of which extends in the direction of movement of the draper substantially throughout the length of the reel and disposed above and along the draper for constantly pressing the cut material down onto said draper to prevent clogging and initiate conveyance of the cut material by the draper, substantially as described.

3. In combination, a platform grain cutting mechanism including a draper and a reel, and a drum extending parallel with and driven from the reel and above the top of the draper to constantly press the cut material down onto the draper, and initiate conveyance of the cut material by the draper, substantially as described.

4. In combination, a platform grain cutting mechanism including a draper and reel, and a drum rotatable about an axis parallel with the axis of the reel and extending substantially throughout the length of the draper and at such a distance above the draper as to constantly press the cut material down onto the draper to initiate conveyance of the cut material by the draper, substantially as described.

5. In combination, a platform grain cutting mechanism including a draper and a reel, and a rotating drum extending substantially parallel with and along the reel and disposed in spaced relation above the draper to constantly press the cut material down onto the draper to facilitate conveyance of the cut material by the draper, said drum having peripherally disposed beaters, substantially as described.

6. In combination, a platform grain cutting mechanism including a draper, and a mustard beater means disposed in spaced relation above said draper and comprising a shaft, heads mounted on said shaft in spaced relation, strip segments disposed in circumferential relation about said heads to form a drum, the abutting margins of said segments projecting radially from the periphery of said drum in interlocking relation with each other and forming projecting beaters, substantially as described.

7. In combination, a platform grain cutting mechanism including a draper, and a mustard beater means disposed in spaced relation above said draper and comprising a shaft, heads mounted on said shaft in spaced relation, strip segments disposed in circumferential relation about said heads to form a drum, the longitudinal abutting margins of said segments projecting radially from the periphery of said drum to form beaters, substantially as described.

8. In combination, a platform grain cutting mechanism including a draper, and a mustard beater disposed along and above said draper and comprising a shaft, and a plurality of hollow drum sections mounted on said shaft and having flat end portions for close end to end abutting relation, and means for locking said drum sections to each other and in close end to end abutting relation, substantially as described.

In testimony, that I claim the foregoing as my own, I hereby affix my signature.

GEORGE C. HARTER.

Copies of this patent may be obtained for five cents each, by addressing the "Commissioner of Patents, Washington, D. C."